United States Patent [19]
Lee

[11] Patent Number: 5,928,552
[45] Date of Patent: Jul. 27, 1999

[54] POWER SUPPLY CIRCUIT OF A MICROWAVE OVEN

[75] Inventor: Sung-ho Lee, Suwon, Rep. of Korea

[73] Assignee: Samsung Electronics Co., Ltd., Suwon-City, Rep. of Korea

[21] Appl. No.: 09/028,352

[22] Filed: Feb. 24, 1998

[30] Foreign Application Priority Data

Nov. 4, 1997 [KR] Rep. of Korea ............... P97-57849

[51] Int. Cl.⁶ ..................................................... H05B 6/68
[52] U.S. Cl. ............................................................ 219/721
[58] Field of Search .................................... 219/721, 723, 219/724; 361/99, 165; 307/141

[56] References Cited

U.S. PATENT DOCUMENTS

| | | |
|---|---|---|
| 4,115,679 | 9/1978 | Moore . |
| 4,321,447 | 3/1982 | Lamb et al. ............................ 219/721 |
| 4,430,540 | 2/1984 | Scalf et al. ............................. 219/721 |
| 4,533,810 | 8/1985 | Harmon et al. ........................ 219/721 |
| 4,556,773 | 12/1985 | Yoshiyuki et al. ..................... 219/721 |
| 4,724,291 | 2/1988 | Inumada . |
| 4,772,808 | 9/1988 | Vial . |

FOREIGN PATENT DOCUMENTS

| | | |
|---|---|---|
| 0 074 408 | 3/1983 | European Pat. Off. . |
| 0 417 800 | 3/1991 | European Pat. Off. . |
| 63-269492 | 11/1988 | Japan . |
| 2-119089 | 5/1990 | Japan . |
| 2-257589 | 10/1990 | Japan . |
| 90-722 | 1/1990 | Rep. of Korea . |
| 90-5036 | 6/1990 | Rep. of Korea . |
| 94-5056 | 6/1994 | Rep. of Korea . |
| 2 229 589 | 9/1990 | United Kingdom . |

*Primary Examiner*—Teresa Walberg
*Assistant Examiner*—Jeffrey Pwu
*Attorney, Agent, or Firm*—Burns, Doane, Swecker & Mathis, L.L.P.

[57] ABSTRACT

A power supply circuit of a microwave oven includes a door switch connected between an AC power supply and a magnetron driving circuit for switching in accordance with a door opening/closing operation, and a power supply control switch connected between the AC power supply and door switch for switching by a power supply command. Also included as parts are a current limit resistor connected between the door switch and magnetron driving circuit, and a relay having a contact point connected in parallel with the current limit resistor to be driven by a low AC voltage supplied from a motor driven by being supplied with the AC power supply when the door switch is on. By using the low AC voltage relay with the small number of coil turns the relay manufacturing time is shortened while improving reliability.

7 Claims, 2 Drawing Sheets und 5,928,552

POWER SUPPLY CIRCUIT OF A MICROWAVE OVEN

BACKGROUND OF THE INVENTION

1. Field of the Invention

The present invention relates to a microwave oven, and more particularly to a power supply circuit of a microwave oven for using a low AC voltage relay to cut off a sudden current in the microwave oven.

2. Description of the Prior Art

Generally, in microwave oven an AC power source is supplied to a magnetron to radiate microwaves, and the radiated microwaves are absorbed in water contained in food to cook the food by a molecular friction heat. A circuit for driving the magnetron uses a high voltage transformer for boosting an AC voltage of 120/230volts. A sudden current is produced during the initial application of operation, electric power for starting the cooking operating due to a characteristic of an inductive load. The sudden current deleteriously affects the internal circuit parts which is liable to result in damage of the parts in several cases. In order to prevent the sudden current, a relay circuit for cutting off the sudden current includes the power supply circuit.

Referring to FIG. 1, a circuit of a microwave oven is formed such that a first door switch 12, a variable program control switch 14 and a normally-open contact point 16a–16c of a monitor switch 16 are serially connected between a first AC power line 10 and one end of a primary coil 42 of a high voltage transformer 40. A timer switch 22, a second door switch 24 and a relay contact point 26 are serially connected between a second AC power line 20 and the other end of primary coil 42. Also, a normally-closed contact point 16b–16c of monitor switch 16 is connected to a common connecting point 23 of timer the switch 22 and the second door switch 24 via a fuse 18. The relay contact point 26 is connected in parallel with a current limit resistor 28. A relay coil 30 is connected in parallel with the normally-closed contact point 16b–16c of the monitor switch 16. A lamp 32 is connected between the first AC power line 10 and 23 of the common connecting point 23 timer switch 22 and the second door switch 24. A fan motor 34 and a timer motor 36 are parallel connected between a common connecting point 13 of the first door switch 12 and the variable program control switch 14 and common connecting point 23 of the timer switch 22 and the second door switch 24. A drive motor 38 is connected between a low AC voltage output node 35 of the fan motor 34 and the common connecting point 23 of the timer switch 22 and the second door switch 24. A magnetron driving circuit 50 is connected to the secondary side of the high voltage transformer 40.

Under the state that the door of the microwave oven is closed, the first and second door switches 12 and 24 assume an on-state. In association with the monitor switch 16, the normally-open contact point 16a–16c is in an on state and normally-closed contact point 16b–16c is off state. Upon setting a cooking time, the timer switch 22 and the variable program control switch 14 are on initially to form an AC closed-circuit by the first door switch 12, the variable program control switch 14, the normally-open contact point 16a–16c of the monitor switch 16, the primary coil 42 of the high voltage transformer 40, the current limit resistor 28, the second door switch 24 and the timer switch 22 at the initial time. Therefore, the sudden current produced from the primary coil 42 is confined by the current limit resistor 28, thereby blocking an electrical shock caused by the sudden current imposed upon the circuit device. Additionally, the AC voltage is also applied to the relay coil 30, but it takes hundreds of ms until the relay coil 30 is excited to make the relay contact point 26 assume an on state. As the result, the relay coil 30 goes to the on state after the sudden current produced at the initial time of supplying the electric power is dissipated.

However, the conventional relay coil is driven by the AC voltage of 120/230 volts. These voltage levels require a large number of coil turns, which incites a problem of requiring so long a time (e.g., 6 minutes) in winding the relay coil during a step of assembling the relay part of a microwave oven automation line. The increased operating time exerts an influence upon output of production per unit time with the consequence of increasing the burden of production cost incurred.

Furthermore, in order to wind lots of turns around the iron core of the relay coil, the coil diameter becomes too thin (e.g., 0.03 cm). The thin coil is highly apt to be disconnected to bring about an inferior relay coil. The inferior coil in turn leads the current to continuously flow through the current limit resistor 28 to generate heat from the current limit resistor 28, which is liable to cause a fire or otherwise damage the microwave.

SUMMARY OF THE INVENTION

The present invention is devised to solve the foregoing problems of the prior art. Therefore, it is an object of the present invention to provide a power supply circuit of a microwave oven capable of using a low AC voltage relay as a relay for cutting of a sudden current.

It is another object of the present invention to provide a power supply circuit for shortening a manufacturing operation time of a microwave oven to a economize cost.

It is still another object of the present invention to provide a power supply circuit for employing a relay having an excellent mechanical characteristic to reduce the rate of inferior goods.

To achieve the above and other objects of the present invention, there is provided a power supply circuit of a microwave oven including a door switch connected between an AC power supply and a magnetron driving circuit for switching in relation with a door opening/closing operation. A power supply control switch connected between the AC power supply and a door switch is switched by a power supply command, and a current limit resistor is connected between the door switch and magnetron driving circuit. Further to these, a relay having a contact point connected in parallel with the current limit resistor is driven by a low AC voltage supplied from a motor driven by being supplied with the AC power supply when the door switch is on.

That is, the present invention is applied with the low AC voltage relay having a relatively small number of coil turns, so that the winding operation time of the relay part can be shortened and the thickness of the coil diameter is maintained to an appropriate thickness to decrease the inferior rate of the goods.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
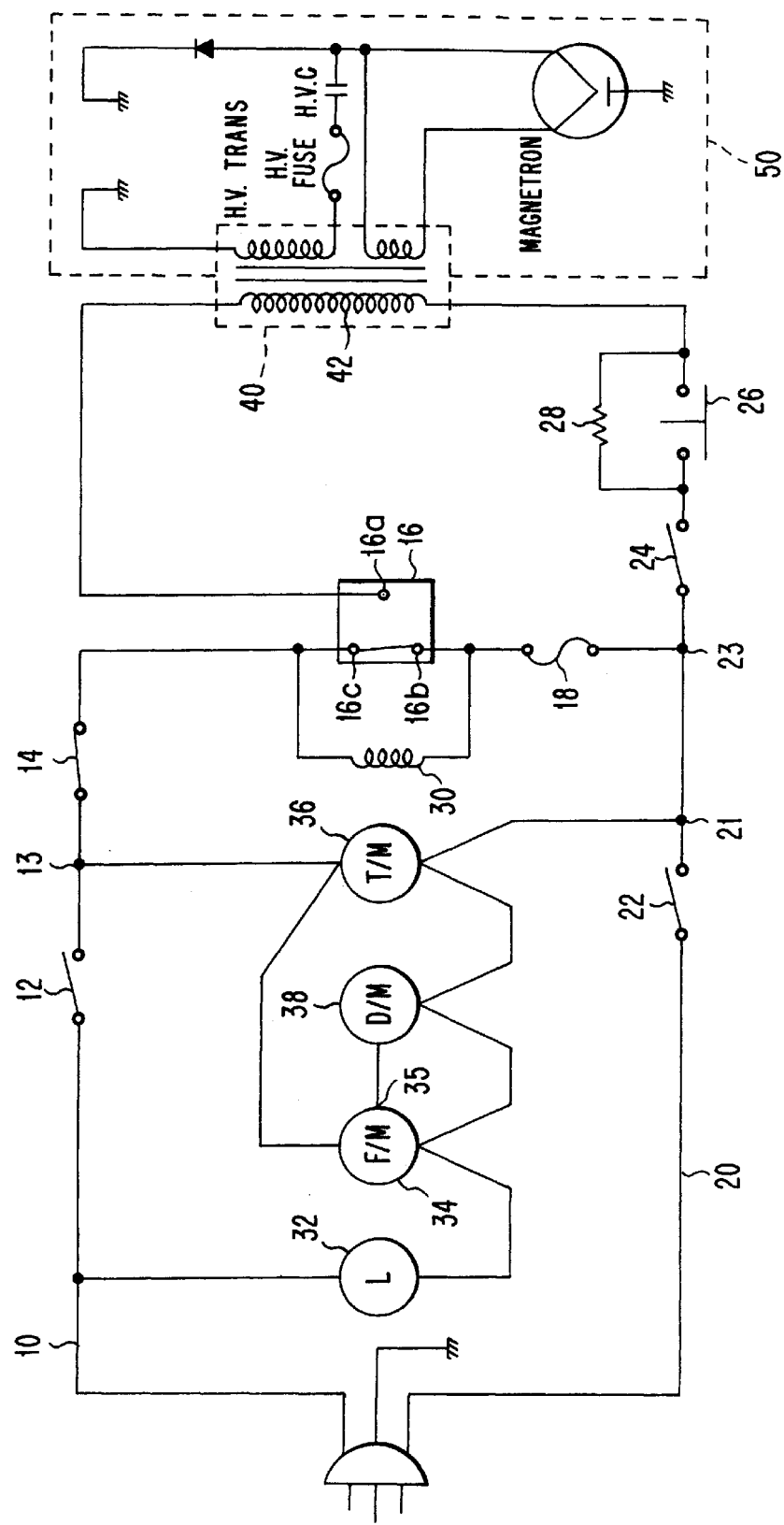
FIG. 1 is a circuit diagram showing a conventional microwave oven employed with a high voltage relay.
Figure 2:
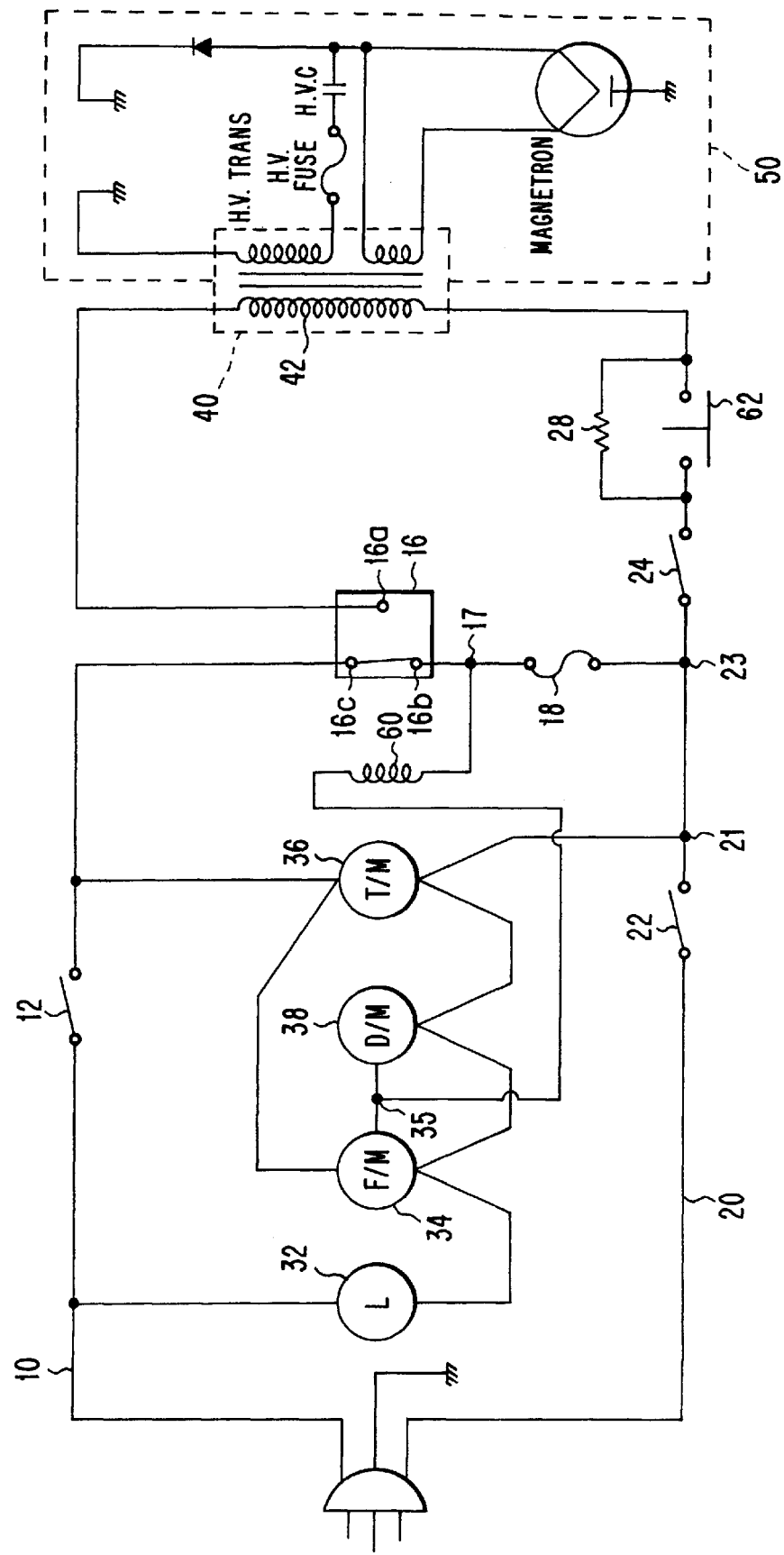
FIG. 2 is a circuit diagram showing a microwave oven employed with a low voltage relay according to the present invention.

FIG. 2 shows a circuit construction of a microwave oven employed with a low voltage relay according to the present invention, in which the same reference numerals designate like parts of FIG. 1.

The circuit of the microwave oven according to the present invention is formed such that a first door switch 12 and a normally-open contact point 16a–16c of a monitor switch 16 are serially connected between a first AC power line 10 and one end of a primary coil 42 of a high voltage transformer 40. A timer switch 22, a variable program control switch 14, a second door switch 24 and a low voltage relay contact point 62 are serially connected between a second AC power line 20 and the other end of primary coil 42. Also, a normally-closed contact point 16b–16c of monitor switch 16 is connected to a common connecting point 23 of variable program control switch 14 and second door switch 24 via a fuse 18. The low voltage relay contact point 62 is connected in parallel with a current limit resistor 28. A lamp 32 is connected between first AC power line 10 and the common connecting point 21 of the timer switch 22 and the variable program control switch 14. A fan motor 34 and a timer motor 36 are parallel connected between a common connecting point 13 of first door switch 12 and the monitor switch 16 and the common connecting point 21. A drive motor 38 is connected between a low AC voltage output node 35 of fan motor 34 and common connecting point 23. A magnetron driving circuit 50 is connected to the secondary side of high voltage transformer 40.

A low voltage relay coil 60 is connected between a common connecting point 17 of normally-closed contact point 16b–16c of the monitor switch 16 and the fuse 18 and low AC voltage output node 35 of the fan motor 34.

Accordingly, the high AC voltage of 120/230 volts is dropped down to the low AC voltage of 21 volts by the fan motor 34, and the relay coil 60 is driven by the low AC voltage of 21 volts.

The first and second door switches 12 and 24 and the monitor switch 16 constitute a door switch which is switched to be on/off in relation with the opening/closing operation of the door. The first and second door switches 12 and 24 are on when the door is open and off when it is closed. Monitor switch 16 is operated in a manner that normally-closed contact point 16b–16c goes to the on state and normally-open contact point 16a–16c goes to the off state when the door is opened; but the state of the monitor switch 16 is switched when the door is closed.

The timer switch 22 and variable program control switch 14, which are the power supply control switch, are driven by the timer motor 36 to be switched to control the electric power supply. The timer switch 22 is on at the moment of the timer setting to be off when the preset time is ended. The variable program control switch 14 repeatedly performs the on/off operation in accordance with a given program when setting the timer.

The present invention constructed as above is operated as follows.

Under the state that the door of the microwave oven is closed, the first and second door switches 12 and 24 are on, and monitor switch 16 is operated such that the normally-open contact point 16a–16c goes to the on state and the normally-closed contact point 16b–16c goes to the off state.

When the cooking time is set, timer the switch 22 and the variable program control switch 14 are on at the initial time.

Thus, at the initial time, an AC closed-circuit is formed by the first door switch 12, the normally-open contact point 16a–16c of the monitor switch 16, the primary coil 42 of the high voltage transformer 40, the current limit resistor 28, the second door switch 24, the variable program control switch 14 and the timer switch 22. Accordingly, the AC is applied to the primary coil 42 to generate an initial sudden current at the primary coil 42 in accordance with the inductive load. Since the sudden the current incurred is confined by current limit resistor 28, the electrical shock due to the sudden current is relieved.

The low AC voltage dropped by the fan motor 34 is also applied to the low voltage relay coil 60, but it takes hundreds of ms until the low voltage relay coil 60 is excited to lead the low voltage relay contact point 62 to go to the on state. As the result, the low voltage relay contact point 62 goes to the on state after the sudden current generated at the initial time of applying the electric power has dissipated.

Once the timer switch 22 and the variable program control switch 14 are off, the power supply is stopped. When the door is open, the first and second door switches 12 and 24 go to the off state and the monitor switch 16 is switched to the normally-closed contact point 16b–16c. If the door is opened while the timer switch 22 and the variable program switch 14 are on state, the first and second door switches 12 and 24 are off to block the power supply. Whereas, if the first door switch 12 maintains the on state due to its inferiority or fault, an AC short circuit is formed via the on contact point of the monitor switch 16. Therefore, the fuse 18 is applied with a great short current to be melted and cut, thereby stopping the power supply.

As described above, the AC voltage dropped by the fan motor 34 is utilized to employ the low voltage relay in the present invention. Therefore, the operating time of winding the coils is shortened and a proper coil diameter is maintained, thereby inhibiting a detriment to resulting in inferior goods.

While the present invention has been shown and described with reference to particular embodiment thereof, it will be understood by those skilled in the art that various changes in form and details may be effected therein without departing from the spirit and scope of the invention as defined by the appended claims.

What is claimed is:

1. A power supply circuit of a microwave oven, comprising:
   a door switch connected between an AC power supply and a magnetron driving circuit, said door switch switching state in relation with a door opening/closing operation;
   a power supply control switch connected between the AC power supply and door switch, said power supply control switch switching state in accordance with a power supplying command;
   a current limit resistor connected between the door switch and magnetron driving circuit; and
   a low voltage relay having a contact point connected in parallel with the current limit resistor, and driven by a low AC voltage supplied from a motor, said motoring being driven by an AC power supply when the door switch is on.

2. A power supply circuit of a microwave oven as claimed in claim 1, wherein the motor comprised a fan motor.

3. A power supply circuit of a microwave oven as claimed in claim 2, wherein the low AC voltage is 21 volts.

4. A power supply circuit of a microwave oven, comprising:

a first door switch switching states in accordance with the open or closed state of a door of said microwave oven;

a monitor switch connected between a power supply and said door switch, said monitor switch controlling a supply of power to a magnetron driving circuit of said microwave;

a current limit resistive element connected between said first door switch and said magnetron driving circuit; and a low voltage relay connected between a low voltage output node of a motor and said monitor switch, said low voltage output node outputting a voltage level significantly lower than voltage supplied to said magnetron driving circuit.

5. A power supply in accordance with claim 4, further comprising a second door switch between said monitor switch and said low voltage relay switch.

6. A power supply in accordance with claim 4, further comprising a timer switch and first and second power lines, power from said first power line being supplied to said monitor switch by said first door switch, and power from said second power line being supplied to said monitor switch by said timer switch.

7. A power supply in accordance with claim 5, further comprising a fuse between said monitor switch and said second door switch.

* * * * *